United States Patent
Guo et al.

(10) Patent No.: US 11,216,690 B2
(45) Date of Patent: Jan. 4, 2022

(54) SYSTEM AND METHOD FOR PERFORMING IMAGE PROCESSING BASED ON A DAMAGE ASSESSMENT IMAGE JUDGEMENT MODEL

(71) Applicant: Alibaba Group Holding Limited, Grand Cayman (KY)

(72) Inventors: Xin Guo, Hangzhou (CN); Yuan Cheng, Hangzhou (CN); Jun Huang, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 180 days.

(21) Appl. No.: 16/555,425

(22) Filed: Aug. 29, 2019

(65) Prior Publication Data

US 2020/0074222 A1 Mar. 5, 2020

(30) Foreign Application Priority Data

Aug. 31, 2018 (CN) .......................... 201811014364.X (51) Int. Cl.
*G06K 9/62* (2006.01)
*G06N 3/08* (2006.01)
*G06Q 40/08* (2012.01)

(52) U.S. Cl.
CPC ......... *G06K 9/6228* (2013.01); *G06K 9/6255* (2013.01); *G06K 9/6262* (2013.01); *G06N 3/08* (2013.01); *G06Q 40/08* (2013.01)

(58) Field of Classification Search
CPC .. G06K 9/6228; G06K 9/6255; G06K 9/6262; G06Q 40/08; G06N 3/08
See application file for complete search history.

(56) References Cited

U.S. PATENT DOCUMENTS

| | | |
|---|---|---|
| 8,180,629 B2 | 5/2012 | Rehberg |
| 9,607,138 B1 | 3/2017 | Baldwin |
| 2001/0046659 A1 | 11/2001 | Oster |

(Continued)

FOREIGN PATENT DOCUMENTS

| | | |
|---|---|---|
| WO | 2017059576 | 4/2017 |
| WO | 2018055340 | 3/2018 |

OTHER PUBLICATIONS

Hyungtae Lee et al.: "Fast Object Localization Using a CNN Feature Map Based Multi-Scale Search", Arxiv.org, Cornell University Library, 201 Olin Library Cornell University Ithaca, NY 14853, Apr. 12, 2016, XP080695042, Section 3.2, Figure 3.

(Continued)

*Primary Examiner* — Ruiping Li
(74) *Attorney, Agent, or Firm* — Shun Yao; Park, Vaughan, Fleming & Dowler (57) ABSTRACT

A system is provided for performing image processing. During operation, the system can obtain a video stream of a target object, and obtain, from the video stream, a plurality of images ranked according to a first sequence. The target object can be, e.g., a damage vehicle. The system can then extract a set of feature vectors corresponding to the plurality of images. The system may sequentially provide the set of feature vectors to a trained damage assessment image judgment model. Next, the system can apply the trained damage assessment image judgment model to determine whether each image in the plurality of images corresponds to a damage assessment image.

14 Claims, 8 Drawing Sheets

(56) References Cited

U.S. PATENT DOCUMENTS

| | | |
|---|---|---|
| 2002/0001398 A1* | 1/2002 | Shimano ............ G06K 9/6293 |
| | | 382/104 |
| 2009/0206993 A1 | 8/2009 | Di Mambro |
| 2013/0015946 A1 | 1/2013 | Lau |
| 2013/0208103 A1 | 8/2013 | Sands |
| 2014/0037184 A1 | 2/2014 | Gorski |
| 2014/0270411 A1 | 9/2014 | Shu |
| 2015/0110364 A1 | 4/2015 | Niinuma |
| 2015/0110366 A1 | 4/2015 | Sezille |
| 2015/0341370 A1 | 11/2015 | Khan |
| 2016/0034786 A1 | 2/2016 | Suri |
| 2016/0063235 A1 | 3/2016 | Tussy |
| 2016/0283787 A1 | 9/2016 | Nepomniachtchi |
| 2016/0307029 A1 | 10/2016 | Vaknin |
| 2017/0048244 A1 | 2/2017 | Loughlin-Mchugh |
| 2017/0060867 A1 | 3/2017 | Moutinho |
| 2017/0061563 A1 | 3/2017 | Falkenstern |
| 2018/0083973 A1 | 3/2018 | Paraskevas |
| 2018/0182039 A1* | 6/2018 | Wang ................... G06K 9/6268 |
| 2019/0073641 A1* | 3/2019 | Utke ...................... G06Q 10/20 |
| 2019/0294878 A1* | 9/2019 | Endras .................. G06T 7/0002 |
| 2020/0034958 A1* | 1/2020 | Campbell .............. G06Q 10/10 |

OTHER PUBLICATIONS

Zhou Huabing et al.: "Image Classification Based on Region of Interest Detection", Visual Communications and Image Processing; Jan. 20, 2004; San Jose; vol. 9813, Dec. 14, 2015, pp. 9813OU-9813OU, XP060063208, paragraph [0001]; figure 1.

* cited by examiner

SYSTEM AND METHOD FOR PERFORMING IMAGE PROCESSING BASED ON A DAMAGE ASSESSMENT IMAGE JUDGEMENT MODEL

RELATED APPLICATION

Under 35 U.S.C. 119, this application claims the benefit and right of priority of Chinese Patent Application No. 201811014364.X, filed Aug. 31, 2018.

BACKGROUND

Field

This disclosure is generally related to the technical field of image processing. More specifically, this disclosure is related to a system and method for training a damage assessment image judgment model, and for performing image processing based on the damage assessment image judgment model.

Related Art

In conventional vehicle insurance damage assessment approaches, a vehicle insurance company can send a professional claim adjuster to the site of the damaged vehicle to conduct a manual survey and damage assessment. The survey and damage assessment conducted by the adjuster can include the following tasks: determining a repair solution, estimating an indemnity, taking photographs of the vehicle on the site and archiving the photographs for subsequent assessment of the damage by a damage inspection person at the vehicle insurance company. Since the on-site survey and subsequent damage assessment are performed manually, an indemnity claiming cycle can be as long as 1-3 days. Such long processing times can result in poor user experience with the vehicle insurance company. Furthermore, since the survey and damage assessments are performed manually, the insurance company may incur large labor and professional training costs.

Due to the above-mentioned drawbacks of using manual survey and damage assessments, vehicle insurance companies have started to apply image-based artificial intelligence and machine learning to vehicle damage assessment approaches that may shorten the wait time and reduce labor costs. These approaches enable a user to take photos of a vehicle on-site using a picture capturing device, e.g., a camera, and the user may upload the photos to a server. A vehicle damage assessment approach may then perform automatic identification of damaged parts and damage degrees based on the on-site pictures uploaded to the server. Therefore, by automating the survey and damage assessment approaches, a vehicle insurance company can reduce the labor costs and improve user experience.

However, in the conventional approaches, several requirements are imposed on the photos taken by the user. The user may find it difficult to comply with these requirements. To help the user, a customer service person may provide real-time guidance while the user is photographing the vehicle. For example, the customer service person may view in real-time the entire photographing process of the user by using a video share function available on a portable electronic device, e.g., a mobile phone. The customer service person may then communicate with user to determine which of the pictures taken by the user can be intercepted. Such real-time customer support may require a large number of customer service persons and may incur large labor costs. Hence, the conventional approaches do not provide an effective solution for acquisition of a vehicle damage assessment image.

SUMMARY

According to one embodiment of the present invention, a system for performing image processing is provided. During operation, the system can obtain a video stream of a target object, and obtain, from the video stream, a plurality of images ranked according to a first sequence. The target object can be, e.g., a damage vehicle. The system can then extract a set of feature vectors corresponding to the plurality of images. The system may sequentially provide the set of feature vectors to a trained damage assessment image judgment model. Next, the system can apply the trained damage assessment image judgment model to determine whether each image in the plurality of images corresponds to a damage assessment image.

In a variation on this embodiment, extracting the set of feature vectors can comprise one or more of: applying a categorization model to the plurality of images to extract a set of basic feature attributes for the plurality of images; applying a target detection and segmentation model to the plurality of images to extract a set of semantic features of the plurality of images; and applying an optical flow model to the plurality of images to extract a set of optical flow features for the plurality of images.

In a further variation on this embodiment, the set of basic feature attributes of the plurality of images may include: whether the plurality of images are blurred, whether the plurality of images include at least a damage area of the target object, whether light is sufficient, whether a photographing angle is skewed, and whether a photographing distance is appropriate.

In a further variation on this embodiment, the set of semantic feature attributes for the plurality of images may include: a number of bounding boxes, a number of segmentation categories, an image ratio of a maximum bounding box, and an image ratio of a maximum segmentation category.

In a variation on this embodiment, the system can train a damage assessment image judgment model by obtaining a plurality of video streams corresponding to a plurality of training-sample target objects. For each video stream associated with each target object the system may obtain a plurality of samples in chronological order from the video stream. The system may extract a set of feature vectors and a set of tag values from the plurality of samples. Next, the system may provide the set of feature vectors to a damage area assessment image judgment model. The system may then train the damage assessment image judgment model, based on the set of feature vectors and the set of tag values, to minimize a prediction damage function.

In a further variation, each sample in the plurality of samples may include a feature vector and a tag value associated with a corresponding image. The tag value can indicate whether the corresponding image is a damage assessment image.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

One way to identify damage assessment images from the pictures taken by the user is by automatically processing pictures of the vehicle. However, in this method, there exists an ambiguity between near, medium, and far-distance photographing, and may be practically difficult to provide a clear and subjective description.

The present invention overcomes the above-mentioned problems by enabling a system to acquire a video stream of the damage vehicle on-site using an image capturing device, e.g., a mobile phone camera. The system may automatically process the video stream, e.g., the processing of the video stream can be performed by using one or more image processing modules integrated in the mobile phone. Subsequent to processing the video stream, the system may automatically select in real-time key frames for damage assessment from the video stream. Therefore, the user is not burdened to comply with photographing requirements during the process of photographing the damage vehicle on-site, thereby improving user experience, enhancing detection accuracy, and improving precision of damage assessment.

According to one embodiment of the present invention, a system for performing image processing is provided. During operation, the system can obtain a video stream of a target object, and obtain, from the video stream, a plurality of images ranked according to a first sequence. The target object can be, e.g., a damaged vehicle. The system can then extract a set of feature vectors corresponding to the plurality of images. The system may sequentially provide the set of feature vectors to a trained damage assessment image judgment model. Next, the system can apply the trained damage assessment image judgment model to determine whether each image in the plurality of images corresponds to a damage assessment image.

Exemplary Environment and Communication

Figure 1:
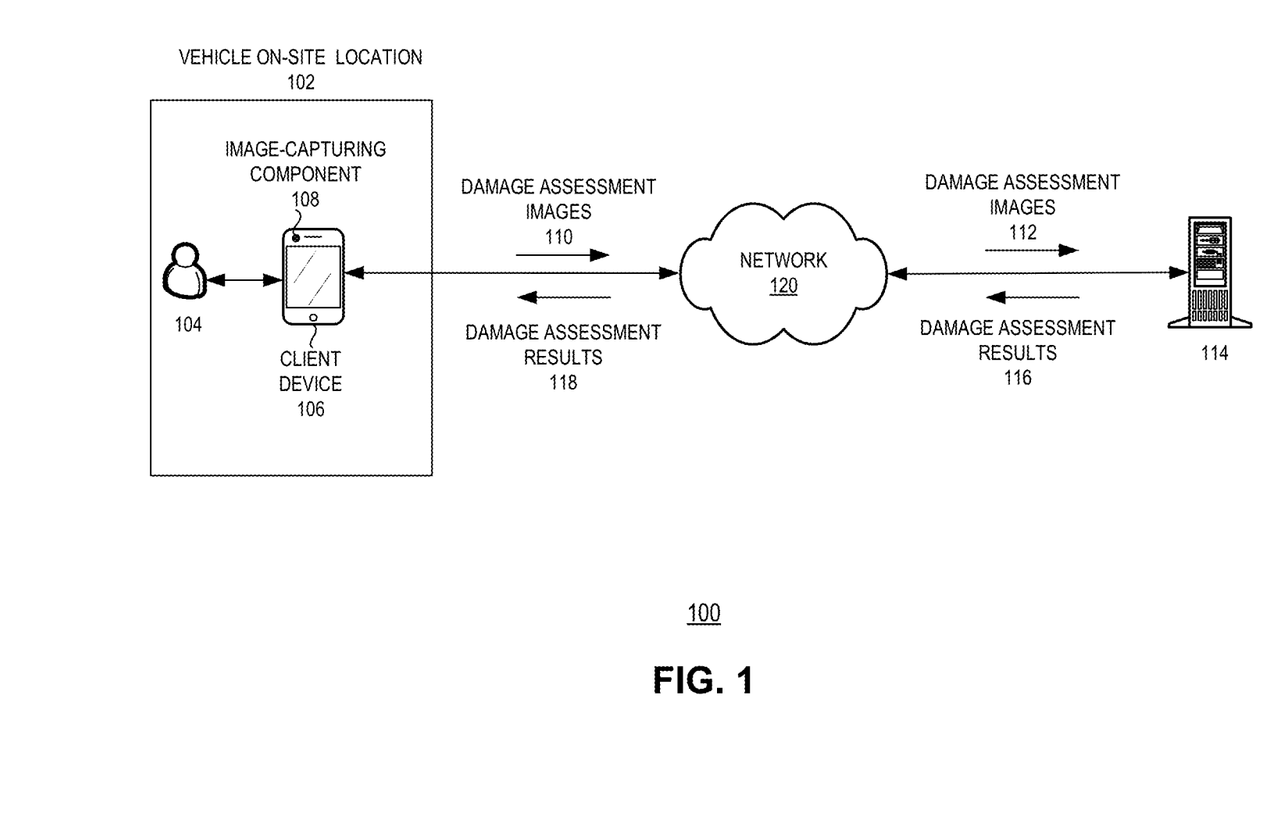
FIG. 1 illustrates an exemplary environment and communication for facilitating image processing, according to one embodiment of the present invention.

FIG. 1 illustrates an exemplary environment and communication for performing image processing, according to one embodiment of the present invention. An exemplary environment 100 can include a vehicle on-site location 102, a communication network 120, and a server 114. At vehicle on-site location 102, a user 104 may use an image capturing component 108 on a client device 106 to record a video stream of a damaged (or accident) vehicle on-site. For example, at vehicle on-site location 102, an owner (user 104) of the accident vehicle may open a photographing interface of an application on client device 106, and enable image capturing component 108, e.g., a camera, to acquire a video stream of the damage vehicle on-site. The application may automatically extract from the video stream a key frame for performing damage assessment.

Client device 106 may be for example, a mobile phone, a communicable smart device, or the like. The application on client device 106 may include one or more image processing modules to process a plurality of images captured by image capturing component 108 and determine one or more damage assessment images 110. The user may use the application on client device 106 to upload the damage assessment images 110 to server 114 via communication network 120. Server 114 may process damage assessment images 112 by using a trained damage assessment model to determine damage assessment results 116. Server 114 may then send damage assessment results 116 to client device 106 via communication network 120, and client device 106 may receive damage assessment results 118.

System Architecture and Operation

Figure 2:
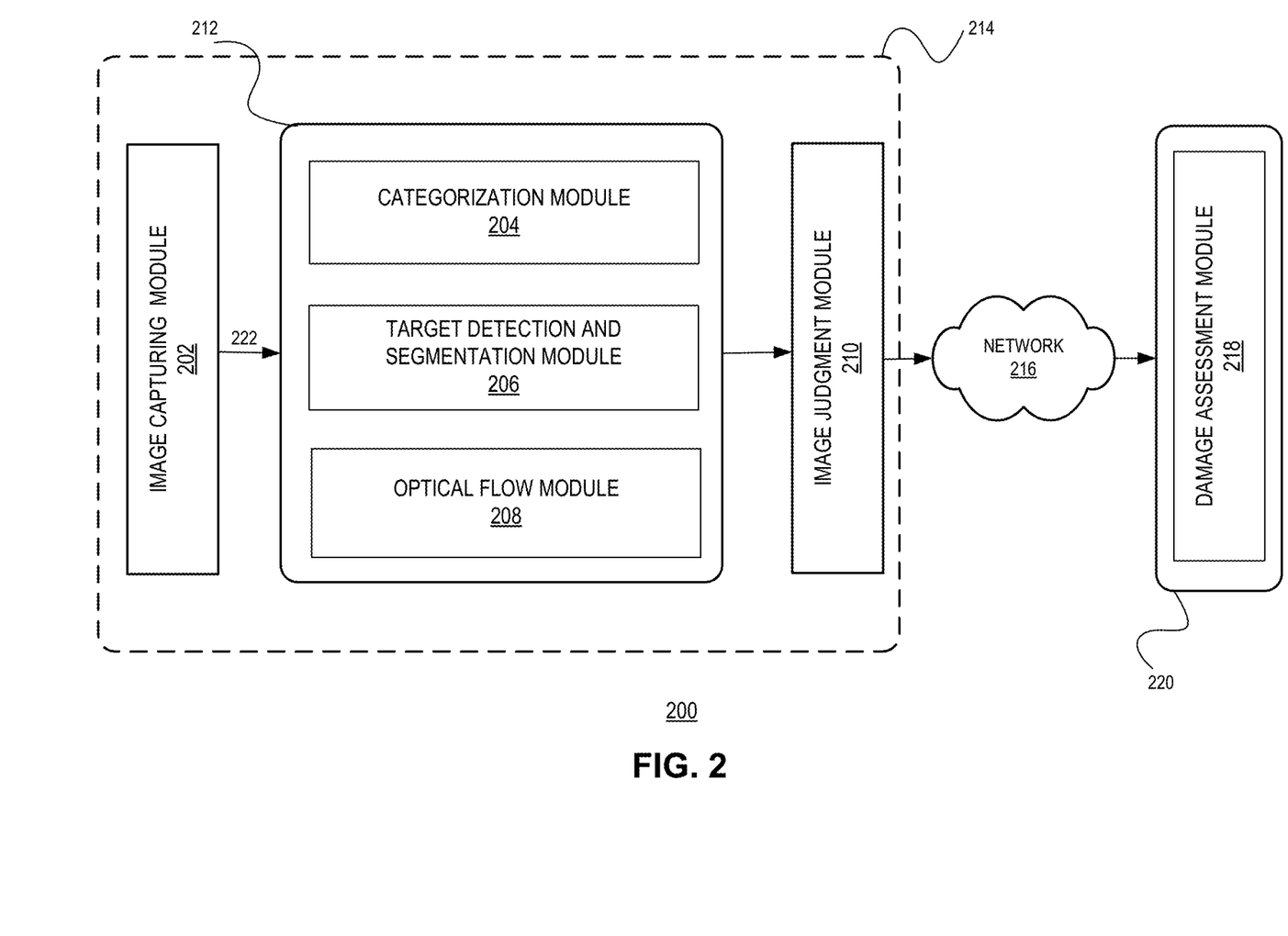
FIG. 2 shows an exemplary image processing architecture, according to one embodiment of the present invention.

FIG. 2 shows an exemplary image processing architecture, according to one embodiment of the present invention. An image processing system 200 can include a mobile device 214 and a server 220. Mobile device 214 can include an image capturing module 202, a feature extraction module 212, and an image judgment module 210. Feature extraction module 212 can further include a categorization module 204, a target detection and segmentation module 206, and an optical flow module 208.

At a vehicle on-site location, when a user opens a photographing interface of an application on mobile device 214, image processing system 200 may enable image capturing module 202 to acquire a video stream of an accident vehicle on-site. For example, a user may open a photographing interface via a camera icon displayed by the application on mobile device 214, e.g., a mobile phone. The user may then align the camera to the accident vehicle. Image capturing module 202 may then acquire a plurality of images of the accident vehicle via the camera to form the video stream of the accident vehicle. The camera may be set to acquire a set of images at a pre-determined interval, e.g., 125 ms. While image capturing module 202 captures the plurality of images, image processing system 200 may display in real-time the plurality of images on the display screen of the mobile phone. Furthermore, while image capturing module 202 acquires the video stream of the accident vehicle, image processing system 200 may input in real-time the acquired video stream to various models deployed on mobile device 214.

In one embodiment of the present invention, image processing system 200 may separately extract a plurality of images from the video stream. Subsequent to extracting the plurality of images, image processing system 200 may provide the plurality of images to different models, e.g., a categorization model, a target detection and segmentation model, and an optical flow model, to acquire in real-time feature information associated with the plurality of images.

Specifically, image processing system 200 may forward the video stream from image capturing module 202 to feature extraction module 212. Feature extraction module 212 may be responsible for processing plurality of image 222 in the video stream to extract a set of feature vectors.

Feature extraction module 212 may apply categorization module 204 to obtain one or more basic attribute features of each frame, i.e., each image in plurality of images 222. Categorization module 204 can include a light weighted image categorization model (suited for a mobile phone) that is capable of quickly processing plurality of images 222 in the video stream. The categorization model may be, e.g., a multi-task categorization model that can include MobileNet v2 (computer vision neural network designed for mobile devices which is based on inverted residuals and linear bottlenecks), ShuffleNet (efficient convolutional neural network for mobile devices), SqueezeNet (small convolutional neural network architecture), or other models.

In one embodiment, categorization module 204 may train the categorization model prior to processing plurality of images 222 in the video streams. For example, categorization module 204 may train the categorization model by using a large number of test vehicle damage images. The test vehicle damage images may include a plurality of tags indicating whether the test vehicle damage images: are blurred, or cover vehicle damage, or have sufficient light, or have a skewed photographing angle, or have an appropriate photographing distance, or other tags. Due to the presence of the plurality of tags, categorization model can perform multi-task learning.

During the process of training the categorization model, categorization module 204 may apply one of the above-listed mobile-end models, e.g., MobileNet v2, to effectively reduce a number of model parameters by optimizing a conventional two-dimensional convolution network. Reducing the number of model parameters in the categorization model may improve an operational efficiency of image processing system 200. In one embodiment, categorization module 204 may perform the optimization by superimposing a plurality of small convolution kernels to achieve an effect of a great convolution kernel so that the number of used parameters is reduced exponentially. In addition, categorization module 204 may replace a conventional two-dimensional convolution operation with a depth-wise separable convolution to reduce the number of model parameters.

The trained categorization model may perform at least one of the following categorizations with respect to plurality of images 222: whether the images are blurred, whether the images cover the vehicle damage, whether light is sufficient, whether the photographing angle is skewed (for example, whether the photographing angle is a skew angle such as top photographing, skew photographing or the like), whether photographing distance is appropriate, etc. Based on a categorization result of the categorization model, categorization module 204 may determine a plurality of basic attribute features for plurality of images 222. The basic attribute features may indicate whether each image in plurality of images 222 satisfies one or more basic requirements of a pre-determined vehicle damage assessment images. The present invention is not limited to the above listed categorizations performed by the categorization model; additional categorizations may be included based on different requirements for the pre-determined vehicle damage assessment images.

Target detection and segmentation module 206 may apply a target detection and segmentation model to automatically detect parts and/or damage areas of the vehicle in the video stream. In one embodiment, target detection and segmentation module 206 may train the target detection and segmentation model prior to processing plurality of images 222 in the video streams. Target detection and segmentation module 206 may train the target detection and segmentation model based on a large number of test vehicle damage images including annotations, e.g., bounding boxes or segmentation information. For example, annotations can be given to the parts or damaged areas of the vehicles, so that target detection and segmentation module 206 may train the target detection and segmentation model with respect to the parts or damage areas of the vehicles.

Target detection and segmentation module 206 may implement a light weighted target detection and segmentation model suitable for a mobile device, for example, MobileNet v2+SSDLite (modified version of Single Shot Detector), or MobileNet v2+DeepLab v3 (semantic segmentation model), or Mask RCNN (instance segmentation model using Region-Convolutional Neural Network) or other models. In one embodiment, image processing system 200 may use a common bottom-layer convolution neural network for the categorization model and the target detection and segmentation model.

Target detection and segmentation module 206 may apply a trained target detection and segmentation model to automatically detect the parts and/or damage areas of the vehicle in plurality of images 222. Target detection and segmentation module 206 may then add bounding boxes and/or target segmentation information at target positions, e.g., a target position can represent a location of damage on the vehicle. Next, target detection and segmentation module 206 may determine semantic features of plurality of images 222 based on the bounding boxes and/or target segmentation information. The semantic features can be related to the target positions or content corresponding to the parts in plurality of images 222. Specifically, the semantic features are related to the bounding boxes and/or target segmentation information. The semantic features may include, but not limited to, at least one of: number of bounding boxes, number of segmentation categories, an image ratio of a maximum bounding box, an image ratio of a maximum segmentation category, etc.

Optical flow module 208 may apply an optical flow model to determine optical flow features associated with a current input image frame and a previous input image frame. In one embodiment, optical flow module 208 may apply the optical flow model to construct optical flow information between image frames by using a plurality of FlowNets (a method for learning optical flow using convolutional neural networks). Each FlowNet in the plurality of FlowNets can be, for example, a convolution neural network. Optical flow module 208 may process a current input image, e.g., an image in a $t^{th}$ frame, by using FlowNet1, and may process a previous input image, e.g., an image in a $(t-1)^{th}$ frame, by using FlowNet2. Optical flow module 208 may then combine the outputs of FlowNet1 and FlowNet2 to obtain optical flow information between the current input image and the previous input image. In one embodiment, optical flow module 208 may train the optical flow model prior to processing plurality of images 222 in the video stream.

Image processing system 200 may construct feature information associated with plurality of images 222 by using at least one of the following features: basic attribute features (from categorization module 204), semantic features and segmentation information (from target detection and segmentation module 206) and optical flow features (from optical flow module 208). The feature information associated with plurality of images 222 may not be limited to the above-mentioned plurality of features. The feature information may include other features according to specific requirements, e.g., photographing position, conversion features, etc.

In one embodiment, feature extraction module 212 may be capable of sequentially acquiring respective feature information associated with a plurality of frames (that include plurality of images 222) based on a sequence of receiving the plurality of frames from the video stream. Feature extraction module 212 may then sequentially provide respective feature information (hereinafter the phrase set of feature vectors is used instead of feature information) associated with plurality of images 222 to image judgment module 210. Image judgment module 210 can include a damage assessment image judgment model, e.g., a Long Short Term Memory (LSTM) neural network model. Image judgment module 210 may apply the damage assessment image judgment model to determine whether each image in plurality of images 222 is a damage assessment image. Specifically, damage assessment image judgment model may output prediction results based on the respective feature vector associated with plurality of images 222 and a sequence in which image judgment module 210 inputs a set of feature vectors to the damage assessment image judgment model. For example, the damage assessment image judgment model may calculate the prediction result for feature vector A ranked last in the input sequence based on feature vector A and prediction result of another feature vector B ranked first in the input sequence. Hence, a set of prediction results output by the damage assessment image judgment model corresponding to the set of feature vectors are correlated with each other.

Image judgment module 210 may use the set of prediction results to determine whether at least one image in the set of images is a damage assessment image or an image that can be effectively used by image processing system 200 for assessing damage in the vehicle. Since image processing system 200 is capable of automatically extracting a key frame or key image from the video stream recorded by a user, the user can be relieved of the burden of taking photos of the accident vehicle according to the requirements of the vehicle insurance company. Moreover, the vehicle insurance company can save large amount of labor costs and time by not sending a damage assessment person to a vehicle accident site.

Figure 3:
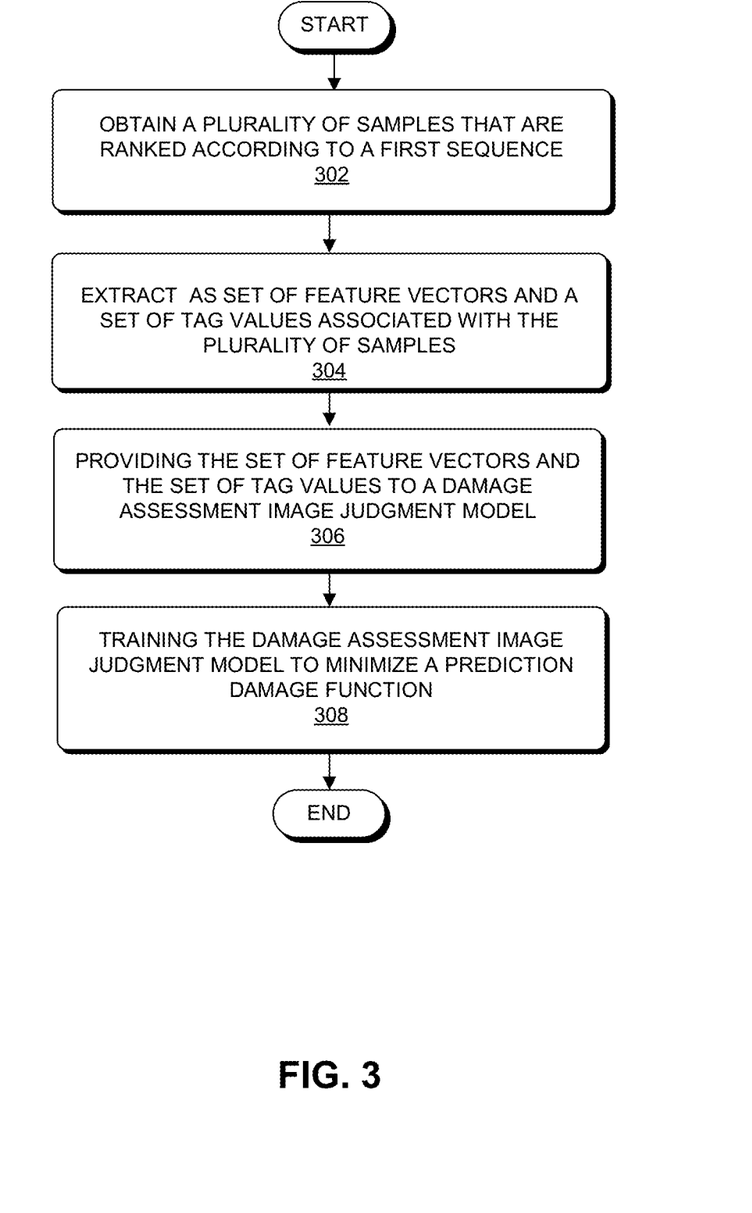
FIG. 3 presents a flowchart illustrating an exemplary process for training a damage assessment image judgment model, in accordance with an embodiment of the present invention.

Image judgment module 210 can train the damage assessment image judgment model prior to processing the set of feature vectors associated with plurality of images 222 in the video stream (FIG. 3 illustrates a process for training the damage assessment image judgment model). In one embodiment, image processing system 200 may use processing time of the damage assessment image judgment model to determine and set an interval at which image capturing module 202 may acquire plurality of images 222 from the video stream.

Image processing system 200 may enable mobile device 214 to upload a plurality of damage assessment images (determined by image judgment module 210) to server 220 via communication network 216. In one embodiment, image processing system 200 may wait until all the plurality of damage assessment images are available at the output of image judgment module 210 and then may upload the plurality of damage assessment images simultaneously to server 220. In a further embodiment, image processing system 200 may upload a damage assessment image to server 220 as soon as the damage assessment image is available at the output of image judgment module 210.

Server 220 may include a damage assessment module 218. Damage assessment module 218 can apply a trained damage assessment model to determine a damage assessment result based on the plurality of damage assessment images uploaded to server 220. Server 220 may then send the determined damage assessment result to the owner the damaged vehicle.

Damage Assessment Image Judgment Model Training

FIG. 3 presents a flowchart illustrating an exemplary process for training a damage assessment image judgment model, in accordance with an embodiment of the present invention. During operation, the system may obtain a plurality of groups of samples from video streams of a plurality of accident vehicles. For example, the plurality of accident vehicles can include several thousands of accident vehicles. Each group of samples corresponds to one accident vehicle from the plurality of accident vehicles. Users, e.g., vehicle owners or a service personnel of a vehicle insurance company, may record video streams with respect to vehicles involved in a plurality of traffic accidents. For example, each user may record a video stream associated with a vehicle involved in an accident.

During the process of training the damage assessment image judgment model, the system may obtain the group of samples from the video stream in a chronological order. In other words, the system may obtain a group of samples (or plurality of samples) from the video stream ranked according to a first sequence (operation 302). Herein, the group of samples in the plurality of groups of samples corresponds one-to-one to plurality of images in each video stream. Furthermore, a ranking sequence of all the samples in the group of samples may correspond to a ranking sequence of the plurality of images. In one embodiment, the system may extract the plurality of images at a time interval of 30 seconds.

The system may extract a set of feature vectors and tag values from the plurality of samples (operation 304). The set of feature vectors and tag value pairs ranked in a sequence can also represent a group of samples. In the group of samples, the set of feature vectors associated with the plurality of images may include, but not limited to, at least one of the following features: attribute features, semantic features, and optical flow features. The attribute features can be basic attribute features of plurality of image, for example, features indicating: whether the plurality of images are blurred, whether the plurality of images cover the damage of the vehicle, whether the light of the image is sufficient, whether the photographing angle of the image is appropriate, whether the photographing distance of the image is appropriate, or other attribute features. The system may acquire the basic attribute features by inputting the plurality of images to a trained categorization model. The semantic features may be related to an object category corresponding to image pixels, and the object category on the image may be segmented by a bounding box and exhibited. The semantic feature may indicate, for example, the number of bounding boxes, the number of object categories, or other semantic features.

In one embodiment of the present invention, the system may provide the set of feature vectors to respective prediction damage functions (associated with the damage assessment image judgment model) for the plurality of images (operation 306). In one embodiment of the present invention, system may adjust a set of parameters of the damage assessment image judgment model by, for example, applying a gradient descend method based on a set of feature vectors and tag values included in the plurality of groups of samples. Specifically, the system may first provide the set of feature vectors and the tag values to a model prediction damage function. The model prediction damage function may be, e.g., a sum of squares of differences of respective prediction damage functions and tag values of the plurality of images, or a sum of absolute values of differences of respective prediction damage functions and tag values of the plurality of images, or other formulations. The system may calculate model prediction values corresponding to the plurality of images, by inputting the set of feature vectors to respective prediction damage functions for the plurality of images. The system may train the damage assessment image judgment model in a manner that the prediction damage functions are minimized (operation 308). The system may then use the model prediction values for predicting whether the corresponding plurality of images can be used as damage assessment images.

In one embodiment of the present invention, the damage assessment image judgment model can be a time sequence model, and may include a cyclic neural network, e.g., LSTM neural network, an RNN (artificial recurrent neural network), a Gated Recurrent Unit (GRU), or other cyclic neural networks. These cyclic neural networks may include a cell (memory part of e.g., LSTM unit) that can keep track of dependencies between elements in the input time sequence. The LSTM neural network may include three gates: an input gate, a forget gate, and an output gate. Other cyclic neural networks may include one or more of these gates or may have other gates as well. For example, in the LSTM neural network the input gate may control an amount of contribution of a new input value into the cell, the forget gate may control an extent to which a value continues to affect the output value in the cell, and the output gate may control an extent the value in the cell is used to compute an output of the cell. In other words, an input to these cyclic neural networks may include in addition to the current data an output result of previous models which represent history information. Hence, the LSTM model may have a better integration capability for data information which has been existent for a long time.

For example, with respect to a plurality of vehicle damage images that are ranked in a sequence, the system may determine using the damage assessment image judgment model that a first image (at a first time point in the ranked sequence) is a vehicle damage image. If the image judgment model then determines that a second image (at a second time point in the ranked sequence) is relatively close to the first image, the image judgment model may consider an output result of the first image (i.e., previous output of the damage assessment image judgment model), and may determine that the second image is not a vehicle damage image.

Furthermore, since the image judgment model can be, e.g., an LSTM model, the system may employ different prediction damage functions with respect to the plurality of images, and the prediction damage functions may correspond to the ranking sequence of the plurality of images. For example, the prediction damage function corresponding to an image ranked at the bottom of the sequence may also include a prediction function result corresponding to another image ranked at the top of the sequence.

In one embodiment, the system may calculate a gradient for the parameters of the image judgment model in the prediction damage function, and may reduce the value of the prediction damage function by adjusting the values of the parameters towards a reverse direction of the gradient. The system may train the image judgment model by using other model optimization methods, e.g., a stochastic gradient descend method, a batch gradient method (BGD), an adaptive momentum estimation method (Adam), RMSprop (optimization algorithm designed for neural networks), and other model optimization methods.

Figure 4:
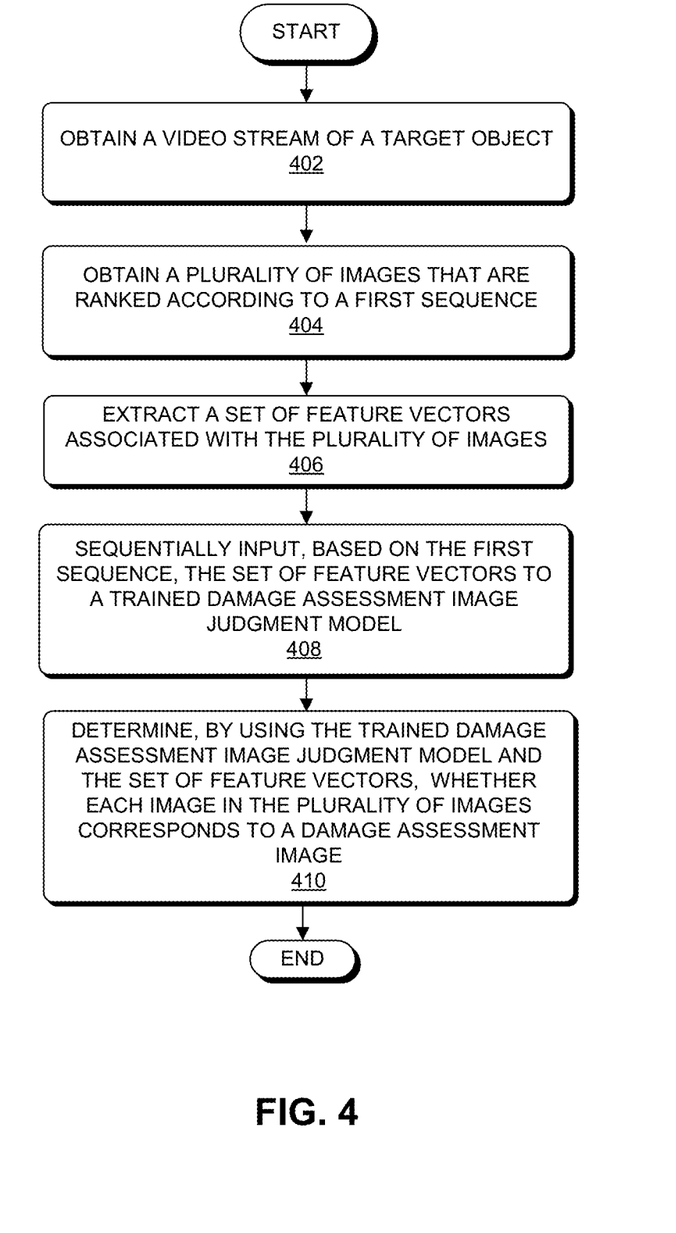
FIG. 4 presents a flowchart illustrating an exemplary process for performing image processing, according to one embodiment of the present invention.

FIG. 4 presents a flowchart illustrating an exemplary process for performing image processing, according to one embodiment of the present invention. During operation, the system may use a camera on a mobile device to obtain a video stream of an accident vehicle or a target object (operation 402). The system may extract from the video stream a plurality of images that are ranked according to a first sequence (operation 404). Next, the system may obtain a set of feature vectors corresponding to the plurality of images (operation 406). Based on the first sequence, the system may sequentially input the set of feature vectors corresponding to the plurality of images to a trained damage assessment image judgment model (operation 408). The system had previously trained the damage assessment image judgment model by using a process illustrated in FIG. 3. The system may use the trained damage assessment image judgment model and the set of feature vectors to determine whether each image in the plurality of images is a damage assessment image (operation 410).

In one embodiment, the process illustrated in FIG. 4 may be performed, for example, on a mobile device. However, the process or method illustrated in FIG. 4 may not be limited to the mobile device. For example, an owner of the vehicle may first record a video stream with respect an accident vehicle, and the process illustrated in FIG. 4 may be implemented on a server of the vehicle insurance company to acquire the damage assessment image from the video stream.

Exemplary Computer System and Apparatus

Figure 5:
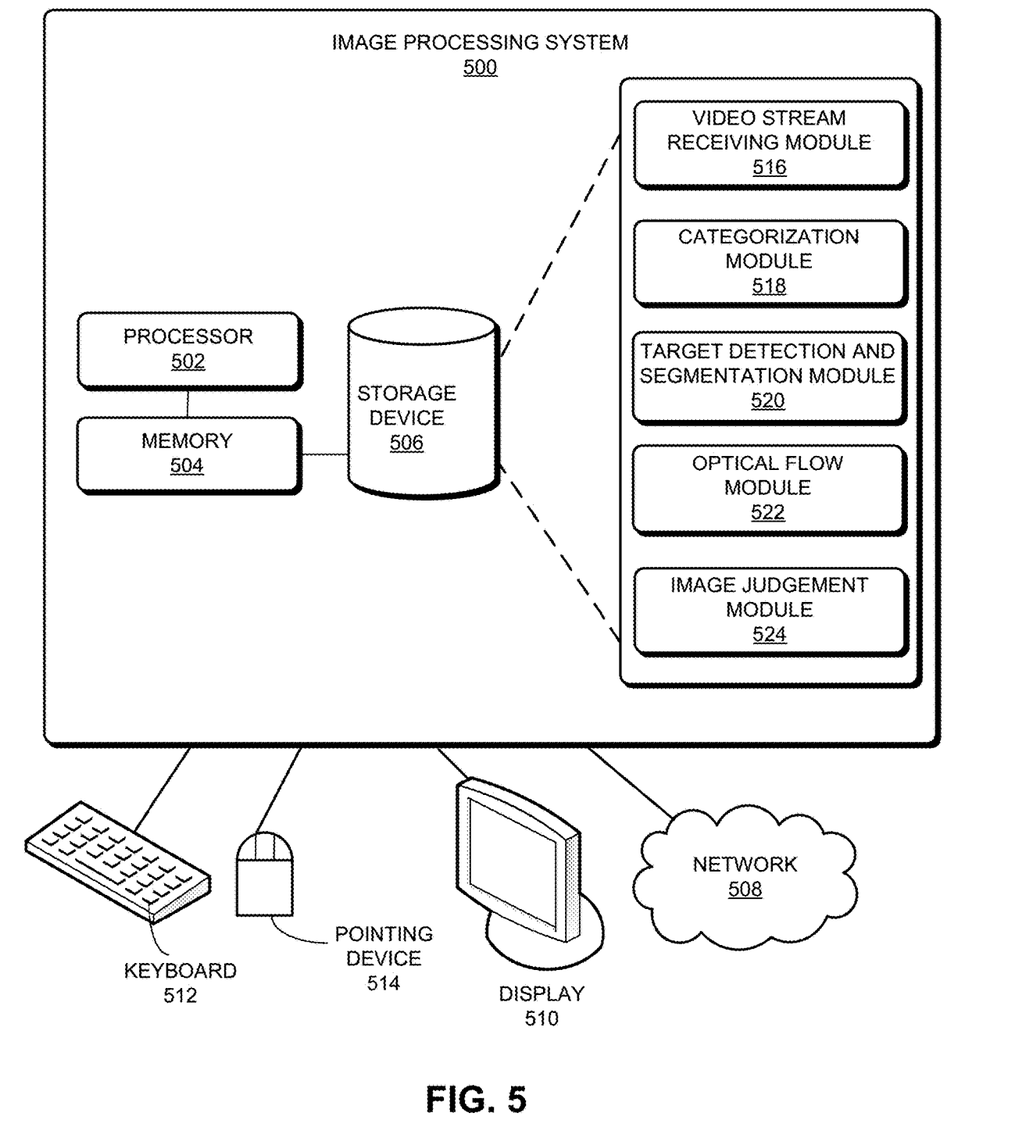
FIG. 5 illustrates an exemplary computer system that facilitates image processing, according to one embodiment of the present invention.

FIG. 5 illustrates an exemplary computer system that facilitates image processing, according to one embodiment of the present invention. Image processing system 500 includes a processor 502, a memory 504, and a storage device 506. Image processing system 500 can be coupled to a display device 510, a keyboard 512, and a pointing device 514, and can also be coupled via one or more network interfaces to network 508.

In one embodiment, storage device 506 can include instructions, which when executed by processor 502 can cause image processing system 500 to perform methods and/or processes described in this disclosure. During operation of image processing system 500, video stream receiving module 516 can acquire from a video stream of an accident vehicle a plurality of images that are ranked in a first sequence. A categorization module 518 may be configured to acquire one or more basic attributes from each image in the plurality of images. A target detection and segmentation module 520 may be configured to acquire semantic features from the plurality of images. The semantic features may indicate a number of bounding boxes, a number of segmentation categories, or the like. An optical flow module 522 may be configured to acquire optical flow features of a current input image and a previous input image. Image processing system 500 may provide the features obtained from modules 518-522 to an image judgment module 524. Image judgment module 524 may include a trained damage assessment image judgment model. Image judgment module 524 may be configured to apply the trained damage assessment image judgment model to the features obtained from the module 518-522 to determine whether each image in the plurality of images is a damage assessment image.

Figure 6:
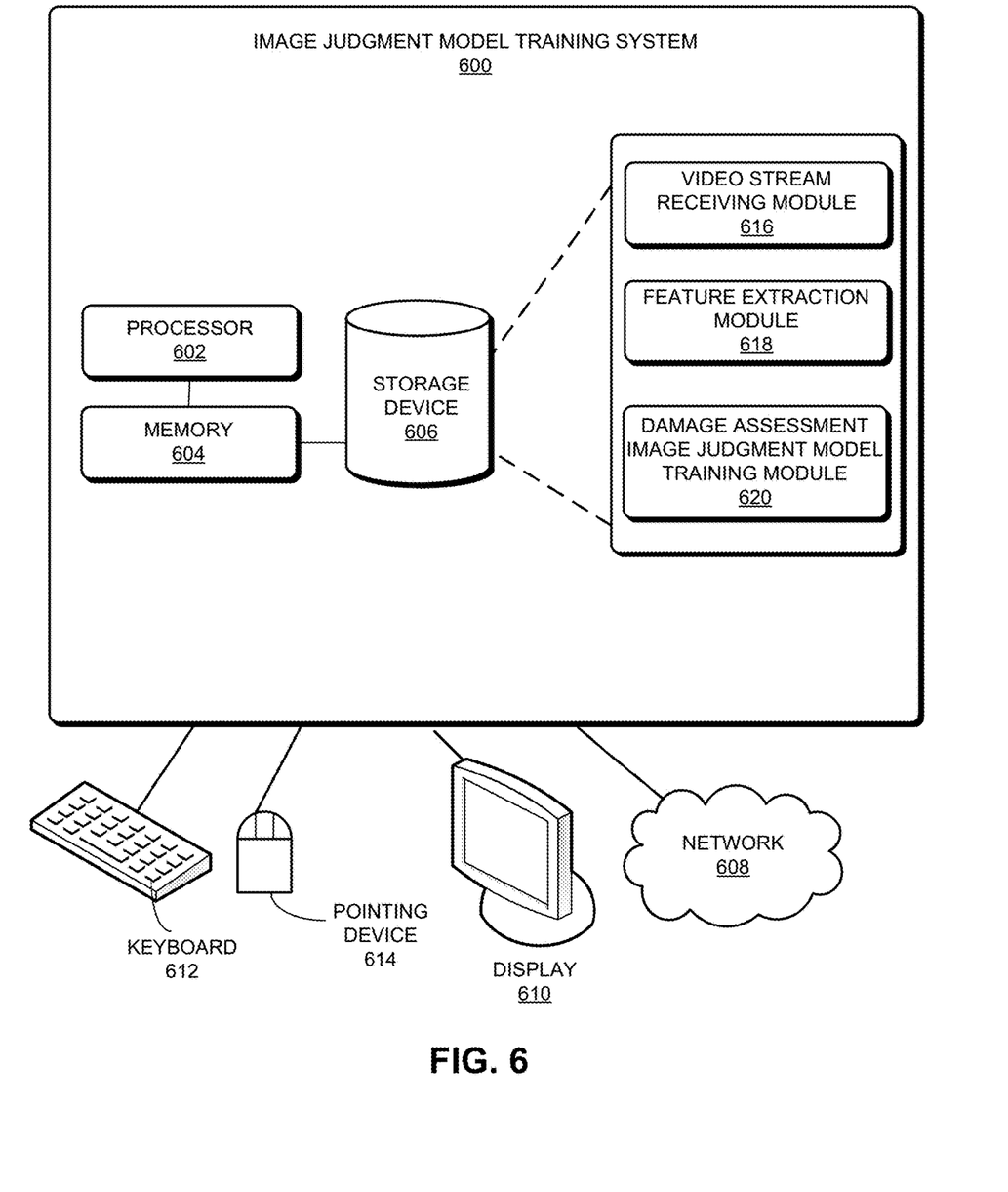
FIG. 6 illustrates an exemplary computer system that facilitates training a damage assessment image judgment model, according to one embodiment of the present invention.

FIG. 6 illustrates an exemplary computer system that facilitates training a damage assessment image judgment model, according to one embodiment of the present invention. Image judgment model training system 600 includes a processor 602, a memory 604, and a storage device 606. Image judgment model training system 600 can be coupled to a display device 610, a keyboard 612, and a pointing device 614, and can also be coupled via one or more network interfaces to network 608.

In one embodiment, storage device 606 can include instructions, which when executed by processor 602 can cause image judgment model training system 600 to perform methods and/or processes described in this disclosure. During operation of Image judgment model training system 600, video stream receiving module 616 can acquire from a plurality of video streams (corresponding to a plurality of accident vehicles) a plurality of groups of samples. Each group of samples corresponds to a plurality of images that are sequentially extracted from a video stream of each accident vehicle. A feature extraction module 618 may include one or more models that can be trained for extracting a set of feature vectors and tag values associated with each group of samples. A damage assessment image judgment model training module 620 may be configured to train a damage assessment image judgment model by using the plurality of groups of samples, the set feature vectors, and tag values associated with each group of samples. Damage assessment image judgment model training module 620 may train the damage assessment image judgment model in a manner that a prediction damage function of the damage assessment image judgment model is reduced. The process of training the damage assessment image judgment model is illustrated in FIG. 3.

Figure 7:
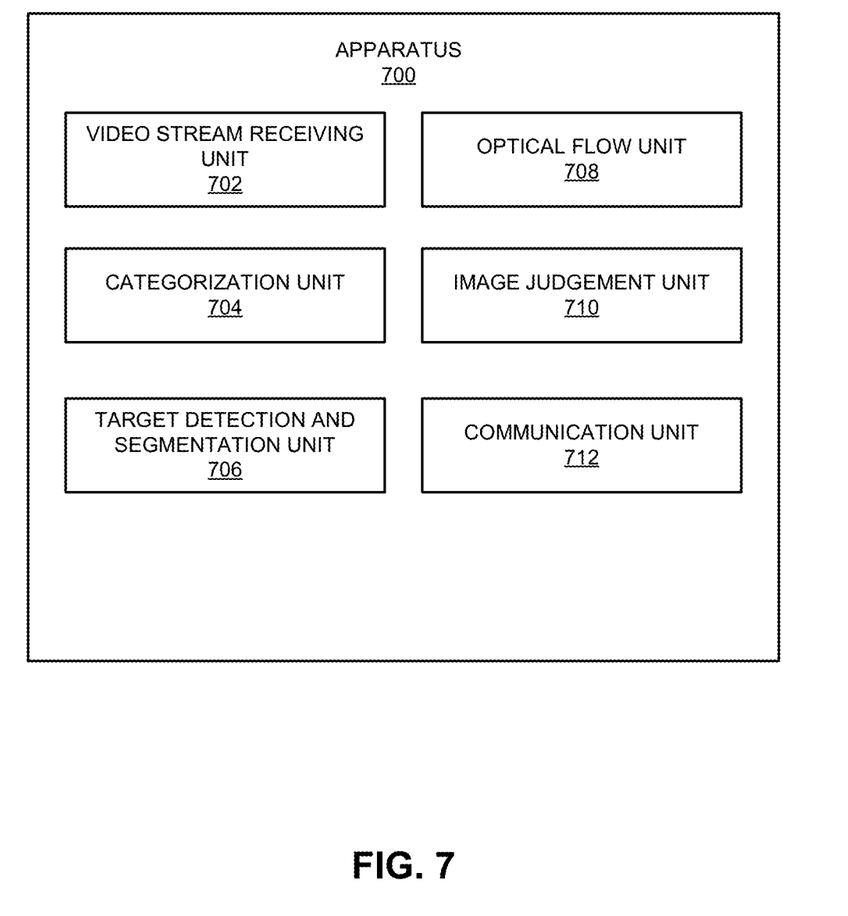
FIG. 7 illustrates an exemplary apparatus that facilitates image processing, according to one embodiment of the present invention.

FIG. 7 illustrates an exemplary apparatus that facilitates image processing, according to one embodiment of the present invention. Apparatus 700 can comprise a plurality of units or apparatuses that may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Specifically, apparatus 700 can comprise units 702-710, which perform functions or operations similar to modules 516-524 of image processing system 500 of FIG. 5, including: an video stream receiving unit 702, a categorization unit 704, a target detection and segmentation unit 706, an optical flow unit 708, and an image judgment unit 710. Apparatus 700 can further include a communication unit 712.

Figure 8:
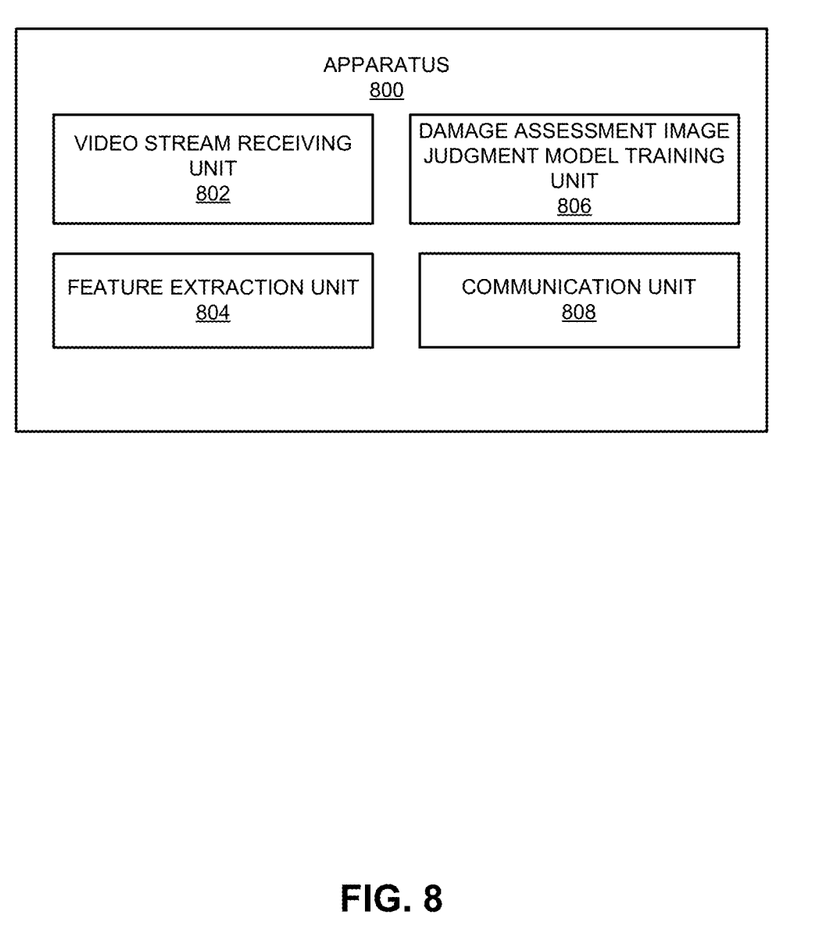
FIG. 8 illustrates an exemplary apparatus that facilitates training a damage assessment image judgment model, according to one embodiment of the present invention.

FIG. 8 illustrates an exemplary apparatus that facilitates training a damage assessment image judgment model, according to one embodiment of the present invention. Apparatus 800 can comprise a plurality of units or apparatuses that may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device that is capable of communicating with other computer systems and/or devices. Specifically, apparatus 800 can comprise units 802-806, which perform functions or operations similar to modules 616-620 of image judgment model training system 600 of FIG. 6, including: an video stream receiving unit 802, a feature extraction unit 804, and a damage assessment image judgment model training unit 806. Apparatus 800 can further include a communication unit 808.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for performing image processing, the method comprising:
   capturing, by a computing device, a video stream of a target object, wherein the video stream includes a plurality of images ranked according to a first sequence;
   providing, based on the first sequence, the plurality of images to a set of models for extracting a first set of feature vectors corresponding to a current image in the plurality of images, which comprises:
applying a categorization model to a current image to extract a set of basic feature attributes
applying an optical flow model to the current image to construct optical flow information between a sequence of consecutive images; and
applying a target detection and segmentation model to the current image to extract a set of semantic feature attributes;
applying a trained damage assessment image judgement model to the first set of feature vectors corresponding to the current image, which involves:
providing, to the trained damage assessment image judgement model, the first set of feature vectors and a previous output of the trained damage assessment image judgement model corresponding to a second set of feature vectors associated with a previous image in the first sequence;
generating a current output corresponding to the current image; and
determining, based on the current output, whether the current image corresponds to a damage assessment image.

2. The method of claim 1, wherein the set of basic feature attributes further comprises:
whether the current image includes at least a damage area of the target object, and whether a photographing angle is skewed.

3. The method of claim 1, wherein the trained damage assessment image judgment model is obtained by:
obtaining a plurality of video streams corresponding to a plurality of training-sample target objects;
for each video stream associated with each training-sample target object:
obtaining a plurality of samples in chronological order from the video stream;
extracting a set of feature vectors and a set of tag values from the plurality of samples;
providing the set of feature vectors to a damage assessment image judgment model; and
training the damage assessment image judgment model, based on the set of feature vectors and the set of tag values, to minimize a prediction damage function.

4. The method of claim 1, wherein the damage assessment judgement model comprises a Long Short Term Memory (LSTM) neural network, a recursive neural network (RNN), or a Gated Recurrent Unit (GRU) neural network.

5. An apparatus for performing image processing, comprising:
one or more processors; and
a storage medium storing instructions that, when executed by the one or more processors, cause the apparatus to perform a method comprising:
capturing, by a computing device, a video stream of a target object, wherein the video stream includes a plurality of images ranked according to a first sequence;
providing, based on the first sequence, the plurality of images to a set of models for extracting a first set of feature vectors corresponding to a current image in the plurality of images, which comprises:
applying a categorization model to a current image to extract a set of basic feature attributes;
applying an optical flow model to the current image to construct optical flow information between a sequence of consecutive images; and
applying a target detection and segmentation model to the current image to extract a set of semantic feature attributes;
applying a trained damage assessment image judgement model to the first set of feature vectors corresponding to the current image, which involves:
providing, to the trained damage assessment image judgement model, the first set of feature vectors and a previous output of the trained damage assessment image judgement model corresponding to a second set of feature vectors associated with a previous image in the first sequence;
generating a current output corresponding to the current image; and
determining, based on the current output, whether the current image corresponds to a damage assessment image.

6. The apparatus of claim 5, wherein the set of basic feature attributes further comprises:
whether the current image includes at least a damage area of the target object and whether a photographing angle is skewed.

7. The apparatus of claim 5, wherein the trained damage assessment image judgment model is obtained by:
obtaining a plurality of video streams corresponding to a plurality of training-sample target objects;
for each video stream associated with each target object:
obtaining a plurality of samples in chronological order from the video stream;
extracting a set of feature vectors and a set of tag values from the plurality of samples;
providing the set of feature vectors to a damage assessment image judgment model; and
training the damage assessment image judgment model, based on the set of feature vectors and the set of tag values, to minimize a prediction damage function.

8. The apparatus of claim 5, wherein the damage assessment judgement model comprises a Long Short Term Memory (LSTM) neural network, a recursive neural network (RNN), or a Gated Recurrent Unit (GRU) neural network.

9. A non-transitory computer-readable storage medium storing instructions that when executed by a computer cause the computer to perform a method for image processing, the method comprising:
capturing, by a computing device, a video stream of a target object, wherein the video stream includes a plurality of images ranked according to a first sequence;
providing, based on the first sequence, the plurality of images to a set of models for extracting a first set of feature vectors corresponding to a current image in the plurality of images, which comprises:
applying a categorization model to a current image to extract a set of basic feature attributes
applying an optical flow model to the current image to construct optical flow information between a sequence of consecutive images; and
applying a target detection and segmentation model to the current image to extract a set of semantic feature attributes;

applying a trained damage assessment image judgement model to the first set of feature vectors corresponding to the current image, which involves:
  providing, to the trained damage assessment image judgement model, the first set of feature vectors and a previous output of the trained damage assessment image judgement model corresponding to a second set of feature vectors associated with a previous image in the first sequence;
  generating a current output corresponding to the current image; and
  determining, based on the current output, whether the current image corresponds to a damage assessment image.

10. The non-transitory computer-readable storage medium of claim 9, wherein the set of basic feature attributes further comprises:
  whether the current image includes at least a damage area of the target object and whether a photographing angle is skewed.

11. The non-transitory computer-readable storage medium of claim 9, wherein the trained damage assessment image judgment model is obtained by:
  obtaining a plurality of video streams corresponding to a plurality of training-sample target objects;
  for each video stream associated with each target object:
    obtaining a plurality of samples in chronological order from the video stream;
    extracting a set of feature vectors and a set of tag values from the plurality of samples;
    providing the set of feature vectors to a damage assessment image judgment model; and
    training the damage assessment image judgment model, based on the set of feature vectors and the set of tag values, to minimize a prediction damage function.

12. The non-transitory computer-readable storage medium of claim 9, wherein the damage assessment judgement model comprises a Long Short Term Memory (LSTM) neural network, a recursive neural network (RNN), or a Gated Recurrent Unit (GRU) neural network.

13. The method of claim 1, wherein the set of basic feature attributes comprise one or more of:
  whether the current image is blurred, whether the current image includes at least a damage area of the target object, whether light is sufficient, whether a photographing angle is skewed, and whether a photographing distance is appropriate.

14. The method of claim 1, wherein the set of semantic feature attributes comprises one or more of:
  a number of bounding boxes, a number of segmentation categories, an image ratio of a maximum bounding box, and an image ratio of a maximum segmentation category.

* * * * *